United States Patent
Lange et al.

(10) Patent No.: US 7,309,445 B2
(45) Date of Patent: Dec. 18, 2007

(54) TRANSFERRING SLURRY FROM A VESSEL

(75) Inventors: Neville Ernest Lange, Gloucester (GB); Geoffrey John Christopher Childs, Cornwall (GB)

(73) Assignee: Axsia Serck Baker Limited, Gloucester (GB)

( * ) Notice: Subject to any disclaimer, the term of this patent is extended or adjusted under 35 U.S.C. 154(b) by 514 days.

(21) Appl. No.: 10/864,412

(22) Filed: Jun. 10, 2004

(65) Prior Publication Data

US 2004/0251196 A1    Dec. 16, 2004

Related U.S. Application Data (60) Provisional application No. 60/477,753, filed on Jun. 12, 2003.

(30) Foreign Application Priority Data

Jun. 11, 2003  (GB)  ................................. 0313424.4

(51) Int. Cl.
*B04C 5/26*    (2006.01)
(52) U.S. Cl. .................. 210/788; 210/803; 210/804; 210/806; 210/259; 210/294; 210/322; 210/512.2; 209/12.1; 209/728
(58) Field of Classification Search ................ 210/788, 210/803, 804, 806, 259, 294, 512.2, 322; 209/12.1, 788, 728
See application file for complete search history.

(56) References Cited

U.S. PATENT DOCUMENTS

| 4,090,523 A | * | 5/1978 | Kelly et al. ............... 210/512.2 |
| 4,226,726 A | * | 10/1980 | Rehm ....................... 210/512.2 |
| 4,655,923 A | | 4/1987 | Leone |
| 4,783,272 A | * | 11/1988 | Patterson .................... 210/787 |
| 5,774,816 A | | 6/1998 | Fontenot et al. |

FOREIGN PATENT DOCUMENTS

| GB | 788957 | 1/1958 |
| GB | 1134642 | 11/1968 |
| GB | 2 094 185 | 9/1982 |
| WO | WO 02/099249 | 12/2002 |

* cited by examiner

*Primary Examiner*—David A Reifsnyder
(74) *Attorney, Agent, or Firm*—Young & Thompson (57) ABSTRACT

Apparatus for transferring slurry from a vessel having a plurality of slurry collection points. The apparatus includes a manifold having a plurality of inlets in flow communication with one or more outlets and a plurality of pressure-reducing cyclones. Each cyclone is associated with a respective one of the collection points and a respective one of the manifold inlets and each cyclone has an inlet port and at least one outlet port. In use, each duct being brings a respective one of the slurry collection points of the vessel into flow communication with an inlet port of a respective one of the cyclones, and/or each duct brings an outlet port of a respective one of the cyclones into flow communication with a respective one of the inlets of the manifold.

13 Claims, 7 Drawing Sheets

TRANSFERRING SLURRY FROM A VESSEL

The present application claims benefit under Title 35, United States Code §119(e) of U.S. Provisional patent application Ser. No. 60/477,753 filed on Jun. 12, 2003.

The present invention relates to transferring slurry from a vessel.

Figure 1:
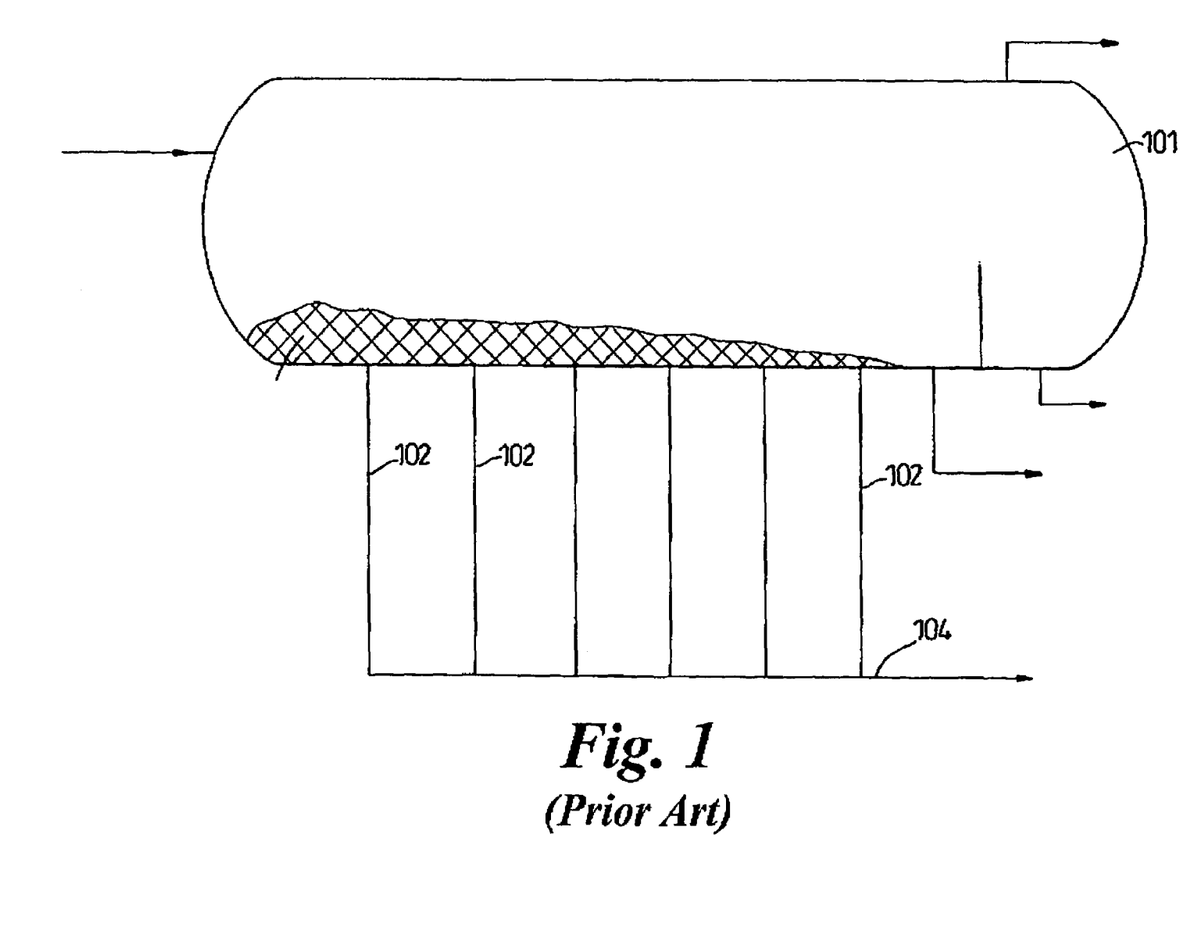
FIG. 1 is a schematic illustration of a first known arrangement where ducts are connected by a manifold.

It is often necessary to remove sand from a vessel. A common example is a production separator used in oil and gas production where unwanted sand mixed with well fluids settles in the separator. Typically, to remove the sand, jets of water or a proprietary fluidising apparatus is used to mix water with the settled sand to form a slurry which is discharged via a collection point to an outlet duct. Sometimes a single collection point will not remove enough of the sand from the vessel. In such cases it is known to have several collection points, all of which are connected to respective outlet ducts that are then connected by a manifold to a single pipeline. This is shown schematically in FIG. 1, where a vessel 101 is connected to six slurry outlet ducts 102 which are connected by a manifold to a single pipeline 104 that discharges the sand.

A slurry flowing in an outlet duct at a constant volumetric flowrate generates a greater pressure drop per unit length as the concentration of the slurry increases. This causes a problem when several slurry outlets from a vessel are simultaneously flowing to a manifold. If one outlet delivers a slurry of a lower concentration into the duct that connects it to the manifold (to which the other slurry outlet ducts are also connected) then the resistance to flow in that duct reduces, causing a greater flowrate from that particular duct. This in turn will cause a lower flow to be drawn from the other ducts, which continue to deliver the slurry at the original concentration.

A first consequence of this is that in total more water will be used to discharge the sand from the vessel. Second, the reduced flowrate from the ducts delivering slurry at the higher concentration may result in less of the sand near their collection points being discharged as the lower flowrate is only able to pick up sand from a reduced radius about the collection point.

This is particularly a problem in production separators where there are likely to be different depths of sand over each collection point, and so if the outlet ducts are simultaneously flowing to a manifold there is a risk that one of the ducts will deliver all its slurry before the others and then subsequently deliver water or oil without sand into the manifold.

In the worst scenario it is possible for this concentration effect to lead to blockage of some of the ducts connecting the collection points to the manifold, by the following chain of events:

1. A first slurry outlet duct delivers slurry at a lower concentration than the others, for example because all the sand adjacent its collection point has already been discharged
2. This reduces the resistance to flow in the duct between that collection point and the manifold, which causes a greater flowrate to the duct
3. The flowrate from the outlet ducts delivering slurry at the higher concentration is reduced because a greater portion of the common flow is now derived from the first outlet duct. This results in lower slurry velocity in the reduced-flowrate ducts
4. Solids in the slurry flowing in reduced-flowrate ducts can be deposited in the ducts because of the lower velocity and this can reduce the flow area in the duct
5. The reduction in flow area in the duct causes an increased resistance to flow, which leads to a further reduction in the flowrate in the duct.
6. This further reduction in flowrate leads to further deposition of solids and repetition of steps 4, 5 and 6 may continue until the duct is blocked with deposited sand.

Blockage of one or more ducts is not necessarily an inevitable outcome of connecting slurry outlets by means of a manifold. The degree to which deposition and flow reduction occurs depends upon numerous factors, including: the characteristics of the slurry; how close the velocity of the slurry in the duct is to the velocity at which sand deposition occurs; the length of the duct between the collection point and the manifold and the flow resistance in the piping carrying the combined flow from the manifold.

The likelihood or severity of this effect may not be easily calculated. The calculation methods for predicting slurry pressure drop and settling do not fully describe these phenomena and rely on empirical data. Additionally, in a real life situation the particle size distribution of the solids in the slurry is likely to be unknown and variable. As a result the calculation methods used are unreliable or of unpredictable accuracy.

The conventional solution to forcing flow sharing in manifolded ducts is to add a pressure drop in the ducts leading from the collection points so that at the desired duct flowrates there is an equal pressure drop in all paths from the collection points to the common manifold outlet. Methods of doing this are described in "Perry's Chemical Engineers Handbook", a very widely used engineering text, and a more complete treatment may be found in "Internal Flow Systems", published by BHR Group. However, these methods are only suitable for flow inequality caused by manifold and branch line pressure drops with homogeneous fluids.

In the use of manifolds with slurry flows, where the concentration effect discussed above comes into play, any increase in the flow resistance in the branch piping by the methods described in the texts above is undesirable as it will increase the magnitude of the pressure drop change which occurs in the branch line when the slurry concentration changes.

Figure 2:
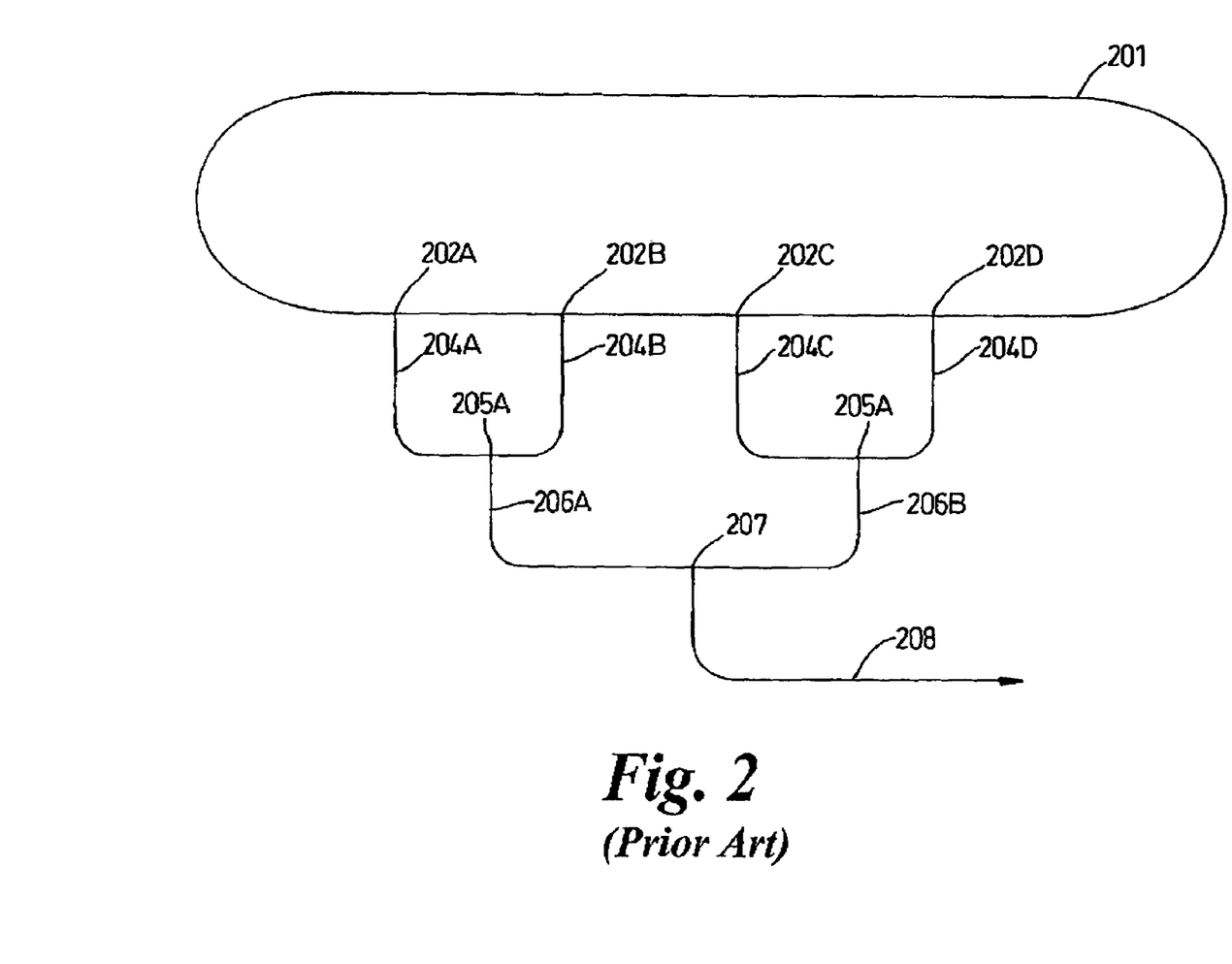
FIG. 2 is a schematic illustration of a second known arrangement.

FIG. 2 schematically illustrates another arrangement of connecting multiple outlets by a manifold that can provide equal flow sharing with homogeneous fluids. The vessel 201 includes four slurry collection points 202A-D. Initially, the four outlet ducts 204A-D fitted to the collection points are connected by a manifold into two pairs of ducts 206A (=pairing of 204A and 204B) and 206B (=pairing of 204C and 204D) and then these two pairs 206A, 206B are connected by a manifold into one outlet pipe 208. Each manifold tee point 205A, 205B is located centrally between the paired collection points 202A/B and 202C/D and the tee-point 207 between the ducts 206A, 206B is also centrally located. An identical arrangement of pipe fittings is used so that an equal flow resistance is produced in all flow paths from the collection points 202A-D to the common manifold outlet 208. Unfortunately, this arrangement has little effect on the flow inequality produced by the concentration effect mentioned above.

Furthermore, the methods described above may deliver an excessive amount of water with the sand, whereas it is often desirable to reduce the amount of fluid used to discharge the sand.

According to a first aspect of the present invention there is provided apparatus for transferring slurry from a vessel having a plurality of slurry collection points, the apparatus including:

a manifold having a plurality of inlets in flow communication with one or more outlets;

a plurality of pressure-reducing cyclones, each said cyclone being associated with a respective one of the collection points and a respective one of the manifold inlets and each said cyclone having an inlet port and at least one outlet port, and a plurality of ducts, in use, each said duct being for bringing a respective one of the slurry collection points of the vessel into flow communication with an inlet port of a respective one of the cyclones, and/or each said duct bringing an outlet port of a respective one of the cyclones into flow communication with a respective one of the inlets of the manifold.

Thus, a said duct may extend between a said collection point and the inlet of its associated cyclone, and the outlet of the cyclone may be directly connected to the associated inlet of the manifold. Alternatively, a said duct may extend between the outlet of a cyclone and its associated manifold inlet, and the cyclone inlet may be directly connected to its associated collection point. Alternatively, a single duct may extend between a said collection point and a said manifold inlet, with a first portion of the duct extending from the collection point to the associated cyclone inlet and a second portion of the duct extending from the cyclone outlet to the associated manifold inlet. All or some of the cyclones may be fitted within their respective ducts.

The ducts, the pressure-reducing cyclones, the manifold inlets and/or the manifold outlet may be external to the vessel. Alternatively, all or some of these components may be located at least partially within the vessel.

The cyclones may have one or two outlet ports. The two outlet ports may be used to discharge sand and water substantially separately into two mainfolds, each of which may be dedicated to either the underflow or overflow of the cyclones. Alternatively, the two outlet ports may be connected together and lead to the manifold inlet.

According to another aspect of the present invention there is provided a vessel including:

a plurality of slurry collection points;

a manifold having a plurality of inlets in flow communication with one or more outlets;

a plurality of pressure-reducing cyclones, each said cyclone being associated with a respective one of the collection points and a respective one of the manifold inlets and each said cyclone having an inlet port and at least one outlet port, and a plurality of ducts, in use, each said duct being for bringing a respective one of the slurry collection points of the vessel into flow communication with an inlet port of a respective one of the cyclones, and/or each said duct bringing an outlet port of a respective one of the cyclones into flow communication with a respective one of the inlets of the manifold.

According to yet another aspect of the present invention there is provided a method of transferring slurry from a vessel, the method including steps of:

bringing a plurality of slurry collection points of a vessel into flow communication with inlet ports of a respective plurality of pressure-reducing cyclones, and bringing outlet ports of the plurality of cyclones into flow communication with a respective plurality of inlets of a manifold, the manifold inlets being in flow communication with one or more outlets, wherein the step of bringing the plurality of slurry collection points into flow communication with the cyclone inlet ports includes fitting a respective plurality of ducts between the collection points and the cyclone inlet ports, and/or wherein the step of bringing the cyclone outlet ports into flow communication the manifold inlets includes fitting a respective plurality of ducts between the cyclone outlet ports and the manifold inlets.

Whilst the invention has been described above, it extends to any inventive combination of the features set out above or in the following description.

The invention may be performed in various ways, and, by way of example only, embodiments thereof will now be described, reference being made to the accompanying drawings, in which.

Figure 3:
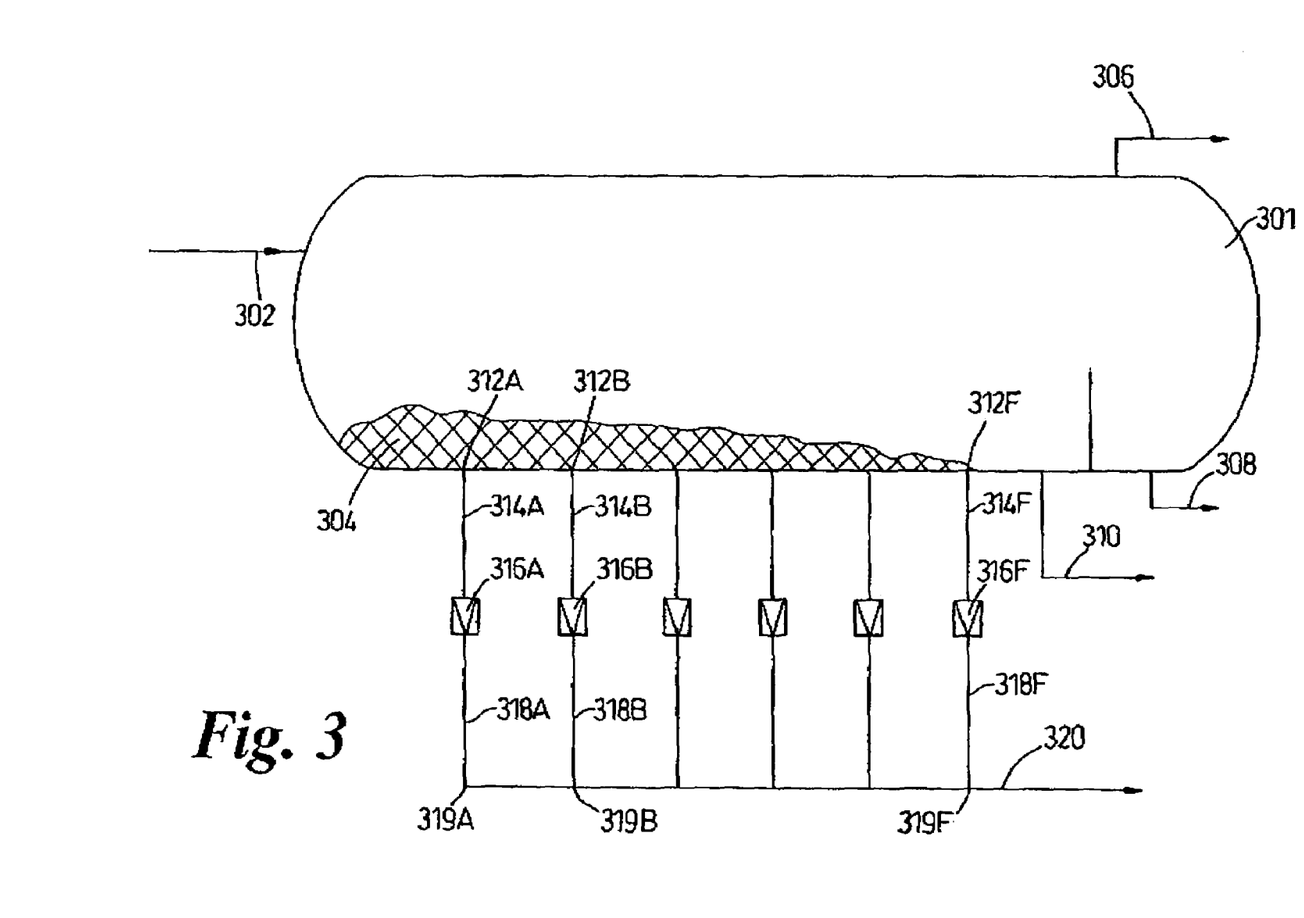
FIG. 3 is a schematic illustration of a first embodiment of the present invention.

Referring to FIG. 3, a horizontal vessel 301 has at one of its ends an inlet 302 which delivers a mixture of water, oil, gas and sand into the vessel. The sand 304 settles along the base of the vessel 301. The sand piles higher near where the inlet 302 enters the vessel, with a decreasing amount settling along the base towards the further end of the vessel. The end of the vessel opposite the inlet 302 includes a gas outlet 306 located at its upper edge. Below this is an oil outlet 308 and a water outlet 310.

The vessel further includes six slurry collection points 312A-F located at substantially equal intervals along its base edge. At each collection point there is fitted a device (not detailed in FIG. 3) for causing the sand that has settled adjacent to it to form a slurry. Examples of such devices include mixers, jetting manifolds and fluidisers (e.g. as described in U.S. Pat. No. 5,853,266, U.S. Pat. No. 4,978,251 and U.S. Pat. No. 4,952,099). Extending downwards from the vessel at the six collection points are first portions 314A-F of six respective slurry ducts. So far, the arrangement described above is substantially conventional and the way in which the mixture from the inlet 302 is separated to discharge oil, water, gas and slurry will be well known to the person skilled in the art.

Figure 4:
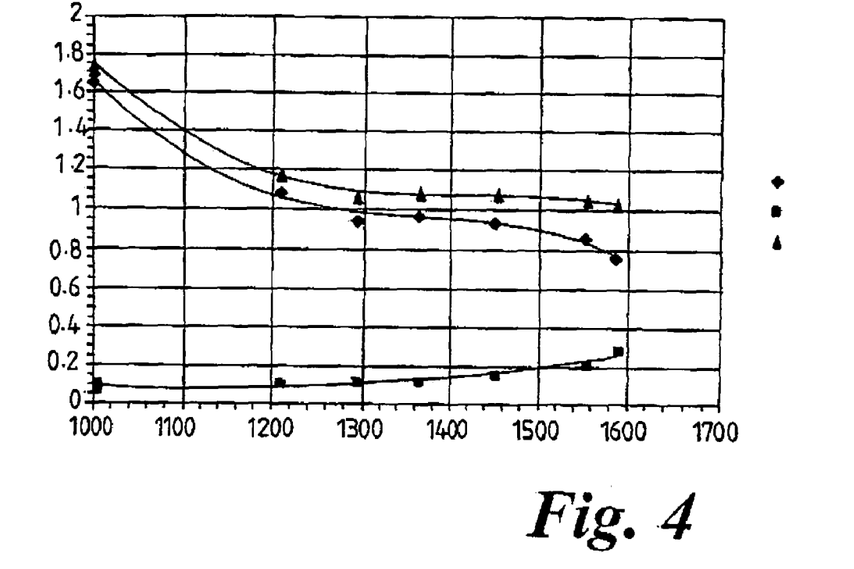
FIGS. 4 and 4a are graphs illustrating how solids concentration affects the pressure drop in a pressure-reducing cyclone and piping at a constant pressure flow rate.
Figure 4A:
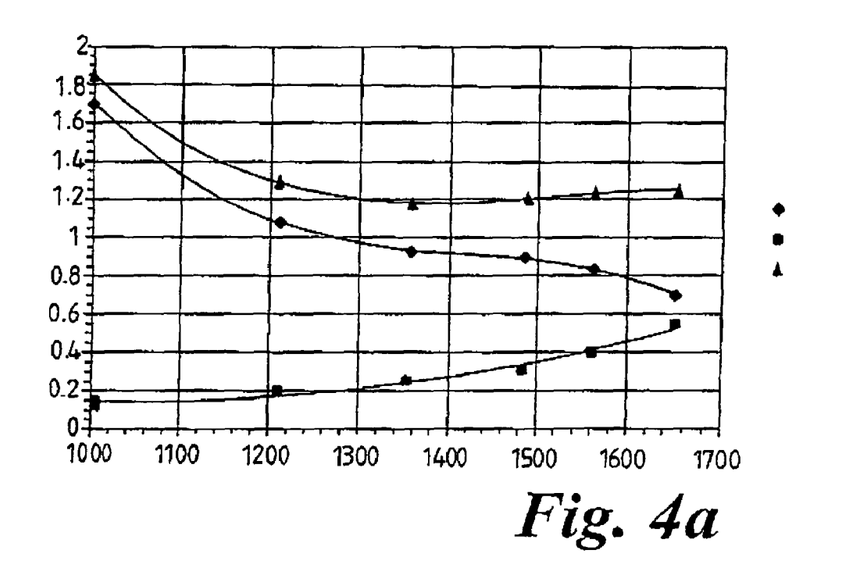

A solid/liquid hydrocyclone has a substantially opposite response to increasing slurry concentration to piping. Thus, a slurry flowing through a hydrocyclone at a constant volumetric flowrate generates a lower pressure drop as the concentration of the slurry increases. This is illustrated by the curves fitted between the diamond-shaped points in the graphs of FIGS. 4 and 4a, where the y-axis represents the pressure drop (in bar) and the x-axis represents the slurry density in $kg/m^3$.

The curves fitted between the square-shaped points in the graphs show the increase in pressure drop in a section of piping as the concentration of the slurry increases. The curves fitted between the triangle-shaped points show the change in pressure drop measured in a duct fitted with a hydrocyclone as featured in an embodiment of the present invention. The volumetric flow rate in the experiments illustrated was 3 m³/h. In the experiment illustrated in FIG. 4 the piping consisted of 2.13 m of pipe and 3 elbows at 25.4 mm (1") nominal size, and in the experiment of FIG. 4a the piping consisted of 2.69 m of pipe and 3 elbows, 3 tees being used as elbows and 1 long radius bend. It can be observed that the pressure drop in the piping increases by a factor of approximately 3 and the pressure drop in the hydrocyclone is reduced by a factor of approximately 2 as the slurry concentration increases to 1650 kg/m³.

The inventors have discovered that this phenomenon can be utilised to advantage in connecting slurry outlets by means of a manifold as in the example of FIG. 3. Six pressure-reducing hydrocyclones 316A-F are attached to the first portions 314A-F of the six respective ducts. Each hydrocyclone is selected so that as the concentration of slurry increases, the decrease in pressure drop through the hydrocyclone is equal to or greater than the increase in pressure drop in the duct in which it is inserted. Downstream of the hydrocyclones 316A-F are second portions 318A-F of the six ducts which are in flow communication six respective inlets 319A-F of a manifold. The manifold therefore brings the six ducts into flow communication with a single outlet pipe 320 through which sand is discharged. Pressure in the vessel 301 pushes the slurry through the hydrocyclones and the manifold.

Each cyclone may be selected so that the decrease in pressure drop through it is substantially equal to the increase in pressure drop in its associated duct and so a change in slurry concentration will have substantially no effect on the flow sharing of the slurry ducts 314A-F.

To reduce the amount of fluid used to discharge the sand, each hydrocyclone 316A-F may be selected so that the decrease in pressure drop through it is greater than the increase in pressure drop in its associated duct. This results in ducts with higher slurry concentration having an increased flowrate compared with ducts with a lower slurry concentration. This means that the combined slurry flow exiting the manifold via outlet 320 is at a higher concentration.

The description above is somewhat simplified for clarity of explanation. One skilled in the art of designing manifolds will know that the resistance to flow along the length of the manifold will also affect the flow sharing in each duct, in that with a plurality of ducts it is the resistance to flow in the entire flow path between the collection point of each duct and the first point in the manifold where all the duct flows are combined that determines the flow sharing of the ducts. The complication that the consideration of the resistance to flow in the manifold introduces is that the flow in the manifold varies at different points along its length because of the addition of the duct flows, and therefore the flow resistance in each flow path becomes interdependent with the flows in the other paths. The "Internal Flow Systems" publication referenced above describes calculation methods to allow for this in the design of manifolds for homogeneous fluids. One skilled in the art would appreciate that when dealing with a flow of slurry it is the change in pressure drop in the entire flow path that must be counteracted by the or each hydrocyclone in the manner described above.

Although the embodiment of FIG. 3 shows a single duct extending between each collection point and each manifold inlet, with each duct being divided into two portions by the hydrocyclone, it will be appreciated that separate ducts could be used, i.e. a first duct between the collection point and the cyclone and a second duct between the cyclone and the manifold. It will also be appreciated that the manifold could be formed so that it includes the ducts that fit to the cyclones as well as the outlet pipe 320.

Figure 5:
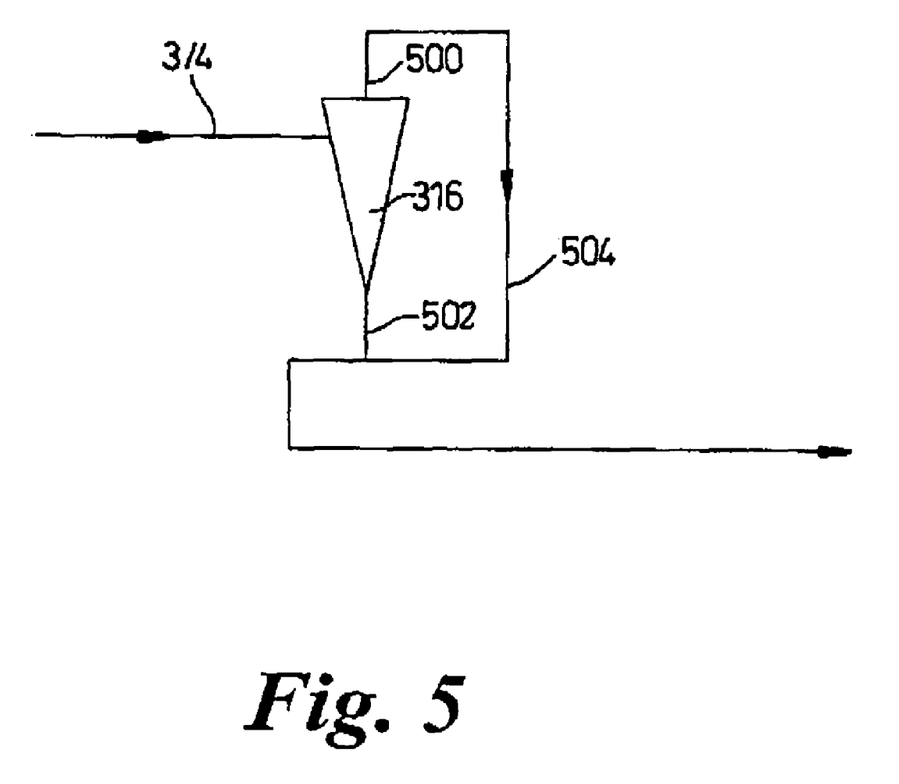
FIG. 5 details connections associated with a hydrocyclone.

The hydrocyclone may be a two-port hydrocyclone as described in GB 2296106 or it may be a conventional three-port hydrocyclone whose two outlet ports may be connected together to reduce the cost of piping. FIG. 5 details the connection of the two outlets 500, 502 of a hydrocyclone 316. A first outlet 500 is connected to piping 504 that joins with the second outlet 502.

Figure 6:
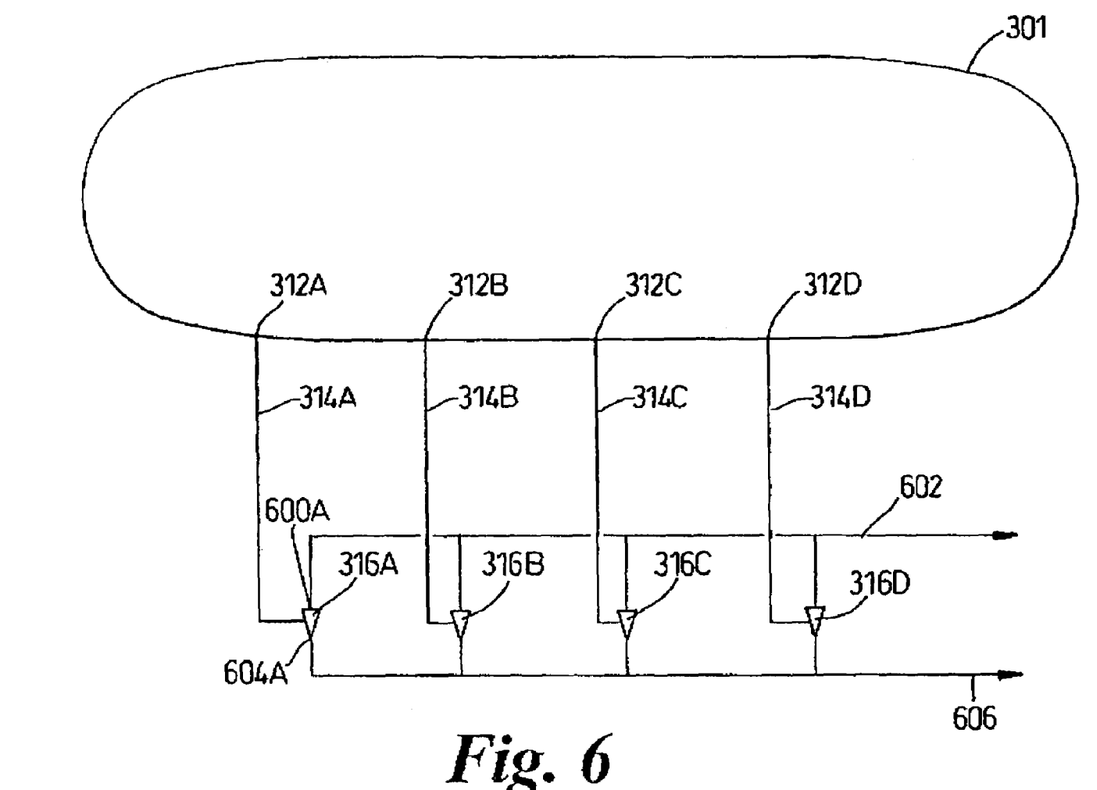
FIG. 6 is a schematic illustration of another embodiment of the present invention.

FIG. 6 shows an arrangement which may be used if the two outlet ports of the hydrocyclone are not combined. Here, one outlet 600 of each hydrocyclone is connected to a first manifold which is in flow communication with a first outlet 602 that is used to discharge water, whilst the other hydrocyclone outlet 604 is connected to a second manifold that is in flow communication with a second outlet 606 that discharges slurry.

Figure 7:
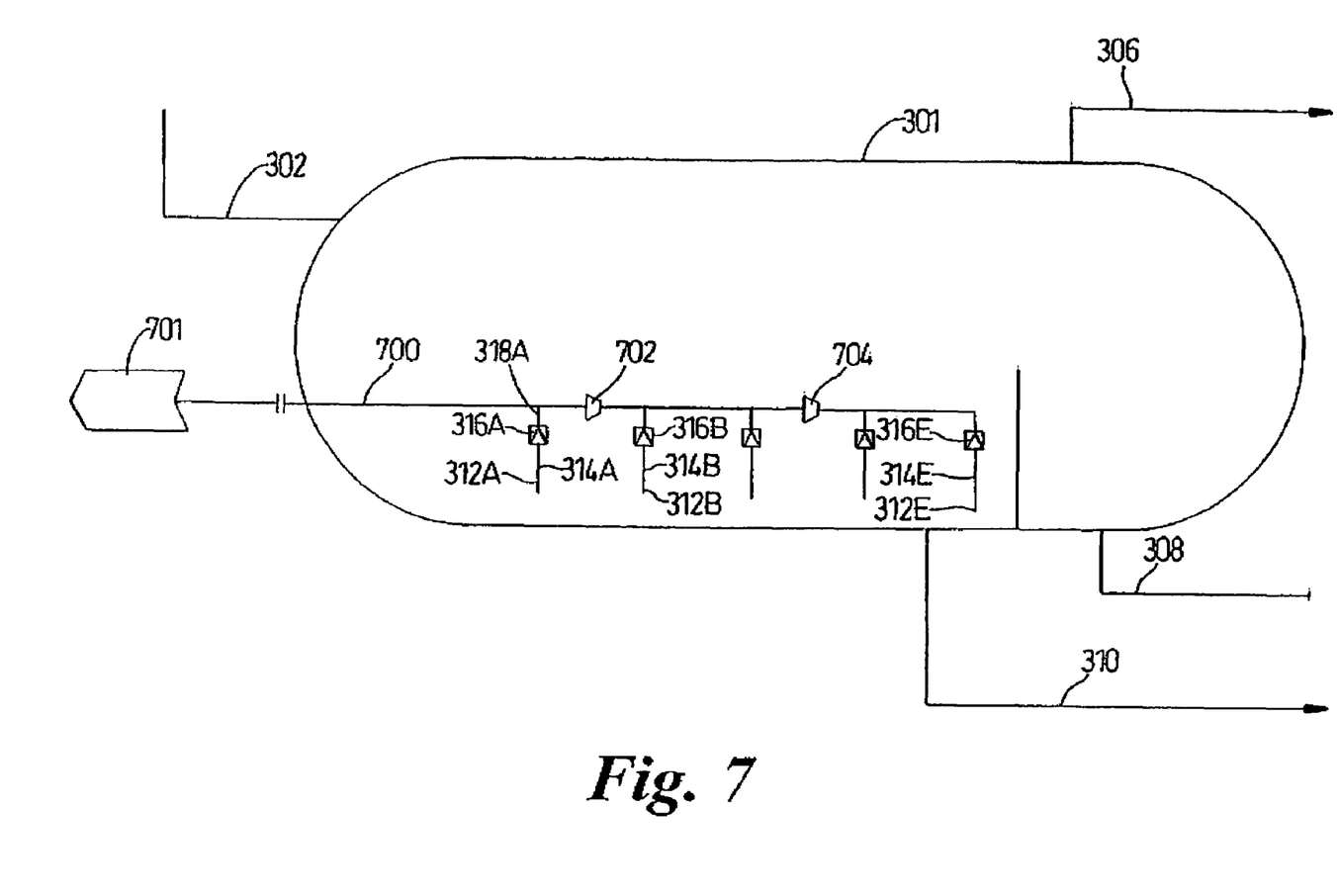
FIG. 7 is a schematic illustration of yet another embodiment of the present invention.

FIG. 7 shows another embodiment where five ducts 314A-E are located inside the vessel 301 and extend upwards from five collection points 312A-E. Five hydrocyclones 316A-E are also located inside the vessel 301 and are connected to the ducts 314A-E. Five branch lines 318A-E, of a manifold (also inside the vessel) are connected to the outlets of respective ones of the hydrocyclones 316A-E, bringing them into flow communication with an outlet pipe 700 that is connection to a sand collection vessel 701. The outlet pipe passes out through the end of the vessel (below the inlet 302) so that sand can be discharged. A first piping-reducing element 702 is fitted to the manifold between the first 318A and second branch line 318B and a second piping-reducing element 704 is fitted between the third 318C and fourth 318D branch lines. The pipe reducing elements may be fitted so that the velocity of the slurry is maintained above the minimum velocity required to keep the slurry in suspension.

The embodiment of FIG. 7 is particularly suited for retrofitting into existing separators where it is undesirable to have to weld new nozzles in a vessel. As can be seen, only one vessel penetration (for the outlet pipe 700) is required. Hydrocyclones having a single outlet port will normally be used in this embodiment.

We claim:

1. Apparatus for transferring slurry from a vessel having a plurality of slurry collection points, the apparatus including:

a manifold having a plurality of inlets in flow communication with one or more outlets;

a plurality of pressure-reducing cyclones, each said cyclone being associated with a respective one of the collection points and a respective one of the manifold inlets and each said cyclone having an inlet port and at least one outlet port, and a plurality of ducts, each of the ducts being associated with a respective one of the cyclones, in use, each said duct bringing a respective one of the slurry collection points of the vessel into flow communication with an inlet port of a respective one of the cyclones, and/or each said duct bringing an outlet port of a respective one of the cyclones into flow communication with a respective one of the inlets of the manifold, wherein the cyclones are selected so that as concentration of slurry increases in use, a corresponding decrease in pressure drop through each of the cyclones is equal to or greater than an increase in pressure drop in its associated duct.

2. Apparatus according to claim 1, wherein a said duct, in use, extends between a said collection point and the inlet of its associated cyclone, and the outlet of the cyclone, in use, is directly connected to the associated inlet of the manifold.

3. Apparatus according to claim 1, further including a plurality of ducts, each of which, in use, extends between the outlet of a cyclone and its associated manifold inlet, and the cyclone inlet, in use, is directly connected to its associated collection point.

4. Apparatus according to claim 1, where, in use, a single said duct extends between a said collection point and a said manifold inlet, with a first portion of the duct extending from the collection point to the associated cyclone inlet and a second portion of the duct extending from the cyclone outlet to the associated manifold inlet.

5. Apparatus according to claim 4, wherein all or some of the cyclones are fitted within their respective ducts.

6. Apparatus according to claim 1, where, in use, the ducts and/or the pressure-reducing cyclones and/or the manifold inlets and/or the manifold outlet are, in use, located at least partially within the vessel.

7. Apparatus according to claim 1, wherein the cyclones each have one outlet port.

8. Apparatus according to claim 1, wherein the cyclones each have two outlet ports.

9. Apparatus according to claim 8, wherein the two outlet ports are used to discharge sand and water substantially separately into two manifold outlets, each of which is dedicated to either the underflow or overflow of the cyclones.

10. Apparatus according to claim 8, wherein the two outlet ports are connected together and lead to the manifold inlet.

11. Apparatus according to claim 1, further including a device for forming a slurry fitted, in use, at each of the slurry collection points.

12. A liquid treatment vessel having a plurality of slurry collection points including the apparatus for transferring slurry according to claim 1.

13. A method of transferring slurry from a liquid treatment vessel having a plurality of slurry collection points, using the apparatus as claimed in claim 1, the method including the steps of:

using a said duct of the apparatus of claim 1 to bring a respective one of the slurry collection points of the vessel into flow communication with an inlet port of a respective one of the cyclones of the apparatus, and/or using a said duct of the apparatus of claim 1 to bring an output port of a respective one of the cyclones of the apparatus into flow communication with a respective one of the inlets of the manifold.

* * * * *